United States Patent
Sugiura et al.

(10) Patent No.: US 7,837,858 B2
(45) Date of Patent: Nov. 23, 2010

(54) METHOD FOR STARTING AUTOTHERMAL REFORMER

(75) Inventors: Yukihiro Sugiura, Kanagawa (JP); Yasushi Mizuno, Kanagawa (JP)

(73) Assignee: Nippon Oil Corporation, Tokyo (JP)

( * ) Notice: Subject to any disclaimer, the term of this patent is extended or adjusted under 35 U.S.C. 154(b) by 352 days.

(21) Appl. No.: 11/992,335

(22) PCT Filed: Sep. 21, 2006

(86) PCT No.: PCT/JP2006/319234

§ 371 (c)(1), (2), (4) Date: Mar. 20, 2008

(87) PCT Pub. No.: WO2007/034989

PCT Pub. Date: Mar. 29, 2007

(65) Prior Publication Data

US 2009/0223861 A1    Sep. 10, 2009

(30) Foreign Application Priority Data

Sep. 21, 2005    (JP)    .............................. 2005-274068

(51) Int. Cl.
C10G 35/04    (2006.01)
(52) U.S. Cl. .......................... 208/62; 208/134; 585/943
(58) Field of Classification Search ............. 208/62–65, 208/134–141; 585/943
See application file for complete search history.

(56) References Cited

U.S. PATENT DOCUMENTS

| 4,985,074 | A | 1/1991 | Okada et al. |
|---|---|---|---|
| 5,929,286 | A | 7/1999 | Krumpelt et al. |
| 6,335,474 | B1 | 1/2002 | Østberg et al. |
| 6,749,828 | B1 | 6/2004 | Fukunaga |
| 6,786,942 | B2 | 9/2004 | Ichikawa |
| 2001/0016275 | A1 | 8/2001 | Takamura |

FOREIGN PATENT DOCUMENTS

| JP | 2001-229953 A | 8/2001 |
|---|---|---|
| JP | 2003-306310 A | 10/2003 |
| JP | 2004-256356 A | 9/2004 |
| JP | 2004-319420 A | 11/2004 |

*Primary Examiner*—Robert J Hill, Jr.
*Assistant Examiner*—Brian McCaig
(74) *Attorney, Agent, or Firm*—Weingarten, Schurgin, Gagnebin & Lebovici LLP

(57) ABSTRACT

For shortening the starting time of an autothermal reformer, the autothermal reformer is started by a method comprising: a first preheating step of heating a reforming catalyst up to a predetermined temperature with use of heating means, the heating means being positioned upstream of the reforming catalyst to heat the reforming catalyst; a second preheating step of stopping the heating after arrival at the predetermined temperature, feeding vaporized fuel and air to the reforming catalyst at the predetermined temperature, allowing the fuel to be oxidized by the reforming catalyst and thereby heating the reforming catalyst; and a starting step of also supplying steam to the reforming catalyst heated by the second preheating step and starting autothermal reforming under the condition for a steady state.

6 Claims, 1 Drawing Sheet

METHOD FOR STARTING AUTOTHERMAL REFORMER

This application is a §371 national phase filing of PCT/JP2006/319234 filed Sep. 21, 2006, and claims priority to Japanese application No. 2005-274068 filed Sep. 21, 2005.

TECHNICAL FIELD

The present invention relates to a method for starting an autothermal reformer which uses, as a raw material, liquid fuel used in a fuel cell system for example.

More particularly, the present invention is concerned with a method for starting an autothermal reformer, the autothermal reformer having a reforming catalyst which also has a liquid fuel oxidizing activity, heating means positioned upstream of the reforming catalyst to heat the same catalyst, a liquid fuel vaporizer, an evaporator for producing steam, and air feed means for the supply of air. Especially, the present invention relates to a method for starting the autothermal reformer in a state in which the temperature of the reforming catalyst is such a low temperature as the atmospheric temperature.

BACKGROUND ART

As reforming methods adopted in reformers used in fuel cell systems and the like there are known steam reforming, partial oxidation reforming and autothermal reforming methods. Above all, the autothermal reforming method is said to be shorter in starting time and faster in load following performance than in the conventional steam reforming method because there occurs a heat transfer between oxidative exotherm and reforming endotherm in the interior of the reforming catalyst used.

However, also in the autothermal reforming method, it is necessary to raise the temperature of the reforming catalyst up to the temperature at which the catalyst exhibits its fuel oxidizing activity. As to a reforming catalyst filled into a catalyst bed, if the reforming catalyst is heated strongly using a burner for raising the catalyst temperature to shorten the starting time, the temperature of only an inlet portion of the catalyst bed rises rapidly due to high-temperature gas issuing from the burner. Therefore, for making the temperature of the entire catalyst bed reach a reformable temperature, it is necessary to repeat ON-OFF of the burner.

According to a method involving introducing gas heated separately with a heater into a reforming catalyst bed and preheating the reforming catalyst up to a reformable temperature, not only much electric power is needed, but also it is difficult to shorten the starting time.

That is, for starting the autothermal reformer stably and quickly, it is absolutely necessary that the temperature of the reforming catalyst be raised quickly with a desired temperature gradient from the inlet toward the outlet of the reforming catalyst bed.

That is, in a steady-state autothermal reforming reaction, the inlet temperature of the catalyst bed is higher than the outlet temperature of the same layer, so in starting the autothermal reformer it is necessary to preheat the catalyst bed inlet to a higher temperature. With the conventional methods, this point is not attained to a satisfactory extent.

In the following Patent Literature 1 there is disclosed a method in an autothermal reactor wherein, in order to shorten the time until restarting after stop, the supply of air is stopped after stop of supply of both reforming fuel and water, allowing the catalyst bed temperature to be retained using only a partial oxidation reaction which is an exothermic reaction. However, this method is not applicable to a case where the catalyst bed temperature is an ordinary temperature such as the atmospheric temperature and fuel and water are not supplied beforehand into the reaction system.

Patent Literature 1: Japanese Patent Laid-Open Publication No. 2002-158027 (U.S. Pat. No. 6,786,942)

DISCLOSURE OF INVENTION

It is an object of the present invention to shorten the starting time of an autothermal reformer, the autothermal reformer comprising a reforming catalyst which has a liquid fuel oxidizing activity, heating means positioned upstream of the reforming catalyst to heat the reforming catalyst, a liquid fuel vaporizer, an evaporator for producing steam, and air feed means for the supply of air.

In a first aspect of the present invention there is provided a method for starting an autothermal reformer comprising a reforming catalyst which also has an oxidizing activity, heating means positioned upstream of the reforming catalyst to heat the reforming catalyst, a liquid fuel vaporizer, an evaporator for producing steam, and air feed means for the supply of air, wherein liquid fuel is vaporized by the vaporizer and the resulting fuel vapor is subjected to autothermal reforming in the presence of the reforming catalyst, the method comprising:

a first preheating step of heating the reforming catalyst up to a predetermined temperature with use of the heating means positioned upstream of the reforming catalyst to heat the reforming catalyst;

a second preheating step of stopping the heating after arrival at the predetermined temperature, feeding vaporized fuel and air to the reforming catalyst of the predetermined temperature, allowing the fuel to be oxidized by the reforming catalyst and heating the reforming catalyst; and a step of also supplying steam to the reforming catalyst heated by the second preheating step and starting autothermal reforming under the condition of a steady state.

In a second aspect of the present invention there is provided, in combination with the above first aspect, a method for starting an autothermal reformer wherein the shift from the first to the second preheating step is performed upon arrival of a reforming catalyst bed inlet temperature at 250° C. or higher.

In a third aspect of the present invention there is provided, in combination with the above first aspect, a method for starting an autothermal reformer wherein the shift from the second preheating step to the steady state is performed upon arrival of a reforming catalyst bed inlet temperature at 600° C. or higher and a reforming catalyst bed outlet temperature at 400° C. or higher.

EFFECT OF INVENTION

According to the present invention, by adopting a step of the reforming catalyst itself being heated by catalyst combustion in addition to the step of heating the reforming catalyst with external heat, the heating of the catalyst is quickened and it is possible to obtain an ideal temperature distribution over the area from the catalyst inlet to the outlet. Consequently, it is synthetically possible to make the starting time shorter than in case of adopting only the step of heating the reforming catalyst with external heat such as a burner.

BEST MODE FOR CARRYING OUT THE INVENTION

[Liquid Fuel]

Figure 1:
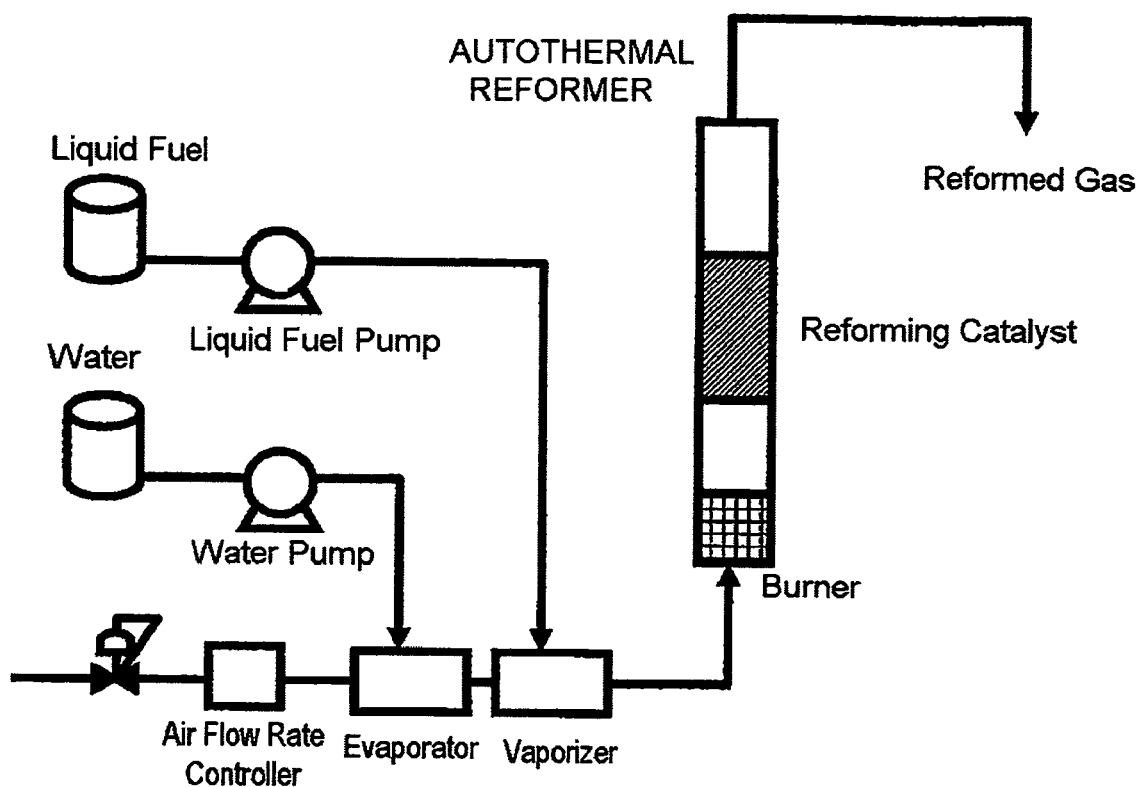
FIG. 1 schematically illustrates the starting method of the present invention.

As the liquid fuel to be subjected to autothermal reforming there may be used any fuel insofar as it is liquid at ordinary temperature and pressure (25° C., 0.101 MPa) and is a hydrocarbon compound containing carbon and hydrogen in each molecule thereof and capable of inducing an autothermal reforming reaction. As concrete examples of employable compounds, mention may be made of saturated hydrocarbons such as decane, undecane, dodecane, tridecane, tetradecane, pentadecane, hexadecane, heptadecane, octadecane, nonadecane, and eicosane; substituted or unsubstituted aromatic compounds such as xylene, ethylbenzene, trimethylbenzene, cumene, propylbenzene, or butylbenzene, pentylbenzene, hexylbenzene, heptylbenzene, octylbenzene, nonylbenzene, decylbenzene, naphthalene, methylnaphthalene, dimethylnaphthalene, ethylnaphthalene, propylnaphthalene, biphenyl, methylbiphenyl, ethylbiphenyl, and propylbiphenyl; and aromatic or nonaromatic compounds having a saturation ring such as tetralin and decalin. It goes without saying that these are illustrative and are mere partial examples of a very large number of employable compounds.

As the liquid fuel containing any of the above hydrocarbon compounds there may be used any of the above pure substances alone, but usually plural compounds selected from among those illustrated above are contained as a mixture in the liquid fuel. As examples of the liquid fuel, mention may be made of naphtha, gasoline, kerosene, gas oil, and fuel produced by Fischer-Tropsch process.

The liquid fuel is vaporized by a vaporizer to be described later and is fed as gas to autothermal reforming reaction together with steam.

[Desulfurization]

It is preferable that the concentration of sulfur contained in the liquid fuel be as low as possible because it has an action of inactivating the reforming catalyst and be 1 mass ppm or less, more preferably 0.1 mass ppm or less. To this end, the liquid fuel may be desulfurized in advance if necessary. There is no special limitation on the sulfur concentration in the raw material fed to the desulfurization process insofar as the sulfur concentration can be changed to the above concentration in the desulfurization process.

No special limitation is placed, either, on the method of desulfurization. As an example there may be mentioned a method wherein hydrodesulfurization is performed in the presence of a suitable catalyst and hydrogen and the resulting hydrogen sulfide is absorbed into zinc oxide for example. In this case, as examples of employable catalysts, mention may be made of catalysts containing nickel-molybdenum or cobalt-molybdenum. There also may be adopted a method wherein sulfur is adsorbed in the presence of a suitable adsorbent and also in the presence of hydrogen if necessary. In this case, as examples of employable adsorbents, mention may be made of adsorbents containing copper and zinc, or nickel and zinc, as main components, such as those disclosed in Japanese Patent No. 2654515 (corresponding U.S. Pat. No. 4,985,074) and Japanese Patent No. 2688749 (corresponding U.S. Pat. No. 4,985,074).

[Reforming Catalyst]

As the catalyst to be used in the autothermal reformer there may be used any catalyst if only it is employable as an autothermal reforming catalyst, that is, if only it has both oxidizing activity and steam reforming activity. For example, nickel and noble metals such as platinum, rhodium and ruthenium are known to have the aforesaid activities, as described for example in such patent literatures as Japanese Patent Laid-Open Publication No. 2000-84410 (corresponding U.S. Pat. No. 6,749,828) and No. 2001-80907 (corresponding U.S. Pat. No. 6,335,474) and U.S. Pat. No. 5,929,286, as well as such a non-patent literature as "2000 Annual Progress Reports (Office of Transportation Technologies)". Above all, noble metals high in liquid fuel oxidizing activity are preferred. Particularly, rhodium, high in both oxidizing activity and steam reforming activity, is preferred.

The catalyst form is not specially limited. For example, there may be used a catalyst having been subjected to tablet compressing, comminution and subsequent granulating in an appropriate range, an extruded catalyst, a catalyst extruded together with an appropriate binder, and a powdered catalyst. There also may be used supported catalysts with metal supported on a carrier, examples of the carrier including a carrier having been subjected to tablet compressing, comminution and subsequent granulating in an appropriate range, an extruded carrier, a powdered carrier, and carriers formed in appropriate shapes such as spherical, ring-like, tablet-like, cylindrical and flake-like shapes. Further, there may be used any catalyst formed itself in a monolithic or honeycomb shape or one obtained by coating a suitable monolithic or honeycomb material with a catalyst.

[Reformer]

The autothermal reformer used in the present invention has the reforming catalyst which also has a liquid fuel oxidizing activity, heating means positioned upstream of the reforming catalyst to heat the same catalyst, a liquid fuel vaporizer, an evaporator for producing steam, and air feed means for the supply of air.

FIG. 1 schematically illustrates the starting method of the present invention. As shown in the same figure, a burner as heating means is positioned upstream of a reforming catalyst, namely, near an outlet position. Further upstream of the burner are disposed a liquid fuel vaporizer, a water evaporator, and an air flow rate controller as air feed means for the supply of air.

That is, in FIG. 1, the air flow rate controller is positioned most upstream, from which air is fed, then water is fed from a water tank through a water pump and is evaporated into steam in the water evaporator, which steam is supplied to a line. Next, liquid fuel is supplied through a liquid fuel pump and is vaporized by the vaporizer, then the resulting vapor is supplied to the line, subjected to mixing properly and introduced into the autothermal reformer. The reforming catalyst is filled in the autothermal reformer and the burner is disposed near a catalyst inlet. In starting the reformer, a catalyst bed is heated with flames of the burner. In steady state, reformed gas is obtained from the reformer.

The liquid fuel vaporizer, the evaporator and the air flow rate controller may be arranged in series or in parallel, provided they are positioned upstream of the burner and are each in a form permitting mixing of fuel, water and air at a position ahead of the burner.

The reforming catalyst usually forms a catalyst bed within the reformer and vaporized fuel, water and air are each, or as a mixture thereof, introduced into the reforming catalyst bed inlet. Then, after autothermal reforming in the catalyst bed, reformed gas is discharged from the catalyst bed outlet. The reformed gas thus discharged is purified suitably and is utilized for example in a fuel cell system.

[Starting Method]

The present invention resides in a method for starting an autothermal reformer comprising a reforming catalyst which also has an oxidizing activity, heating means positioned upstream of the reforming catalyst to heat the reforming catalyst, a liquid fuel vaporizer, an evaporator for producing steam, and air feed means for the supply of air, wherein liquid fuel is vaporized by the vaporizer and the resulting fuel vapor is subjected to autothermal reforming in the presence of the reforming catalyst.

More specifically, the autothermal reformer is started by the method comprising:

a first preheating step of heating the reforming catalyst up to a predetermined temperature with use of the heating means positioned upstream of the reforming catalyst to heat the reforming catalyst;

a second preheating step of stopping the heating after arrival at the predetermined temperature, feeding vaporized fuel and air to the reforming catalyst of the predetermined temperature, allowing the fuel to be oxidized by the reforming catalyst and heating the reforming catalyst; and a step of also supplying steam to the reforming catalyst heated by the second preheating step and starting autothermal reforming under the condition of a steady state.

The shift from the first to the second preheating step is performed upon arrival of a reforming catalyst bed inlet temperature at 250° C. or higher. Further, the shift from the second preheating step to the steady state is performed upon arrival of the reforming catalyst bed inlet temperature at 600° C. or higher and a reforming catalyst bed outlet temperature at 400° C. or higher.

(Preheating Step with External Heat)

In the first preheating step, the reforming catalyst is heated up to a predetermined temperature with use of heating means such as a burner. In this case, as shown in FIG. 1, by adopting a burner as heating means and by introducing vaporized fuel from liquid fuel and air into the burner and subsequent ignition, it is possible to heat the reforming catalyst bed quickly. As to the vaporized fuel and air there may be used separate ones, but it is convenient to use vaporized fuel and air provided for reforming use. The flow rate of liquid fuel and air can be determined suitably according to characteristics of the burner, but for causing burner combustion it is preferable that the air-fuel ratio be in the range of 1 to 2 (volume ratio).

(Preheating Step with Inner Heat)

In the second preheating step, the heating means is turned OFF and catalyst combustion is allowed to take place over the reforming catalyst with use of vaporized fuel from liquid fuel and air, thereby raising the temperature of the reforming catalyst. In this case, for example in the system of FIG. 1, the operation of the heating means can be stopped by increasing the amount of air to extinguish the fire of the burner. By causing catalyst combustion of the fuel, the whole of the reforming catalyst is heated and the temperature can be raised to a satisfactory extent even at the catalyst bed outlet without the catalyst bed inlet alone being heated.

The flow rate of liquid fuel and air in the second preheating step can be determined to a value permitting the occurrence of catalyst combustion of liquid fuel, but it is preferable that the air-fuel ratio be in the range of 2.5 to 5 (volume ratio).

At the time of switching from the first to the second preheating step it is preferable that the reforming catalyst bed inlet temperature be 250° C. or higher. If the inlet temperature is lower than 250° C., it is impossible to induce catalyst combustion even in the use of a noble metal catalyst as the reforming catalyst and hence the catalyst bed cannot be sufficiently heated by catalyst combustion in the second preheating step which follows.

Subsequent to the second step, steam is fed to the reforming catalyst whose temperature was raised in the second step and the amount of liquid fuel fed is increased or decreased to the predetermined amount in steady state to start steady state of autothermal reaction. The "predetermined amount" as referred to herein is meant the flow rate of liquid fuel considered necessary in producing hydrogen steadily. In the autothermal reformer it is usually larger than the flow rate of liquid fuel sufficient for catalyst combustion.

It is preferable that switching from the second preheating step to the steady state of autothermal reforming be done at a reforming catalyst bed inlet temperature of 600° C. or higher and a like layer's outlet temperature of 400° C. or higher. If the inlet temperature is lower than 600° C. or if the outlet temperature is lower than 400° C., it is impossible to induce a satisfactory autothermal reaction throughout the catalyst bed even under introduction of steam.

Once the reformer is started and shifted into the steady state in the manner described above, a subsequent steady operation will be ensured.

Example

The autothermal reformer shown in FIG. 1 was turned OFF and then started from the stage of atmospheric temperature with use of kerosene as liquid fuel. 392 g of Rh (1 mass %)/spherical alumina (3 mm dia.) was filled as a reforming catalyst into the autothermal reformer.

First, 60 g/h of kerosene and 752 L/h of air (air-fuel ratio 1.1) were introduced into the burner, followed by ignition of the burner. As a result, in 3 minutes from OFF condition, the catalyst bed inlet temperature reached 250° C. The kerosene was vaporized by the vaporizer and actually the whole amount thereof was burnt in the burner.

The amount of air was increased to 2052 L/h (air-fuel ratio 3) to extinguish the fire of the burner. In this state, the vaporized kerosene was fed to the catalyst bed together with air, with shift to catalyst combustion. As a result, in 10 minutes from OFF condition, the catalyst bed inlet temperature reached 600° C. and the same layer's outlet temperature reached 400° C. In this state, the amount of kerosene supplied was increased to 200 g/h as a design value set for the reformer and the amount of air was set to 612 L/h ($O_2/C=0.4$) as autothermal reforming condition, then the supply of water was started. The amount of water supplied was 643 ml/h ($S/C=2.5$) as an autothermal reforming condition. Water was evaporated into steam by the evaporator and was introduced in this state into the reformer.

In 1 minute after the supply of water the catalyst bed inlet and outlet temperatures became stable at 650° C. and 550° C., respectively, and 1.8 $m^3$/h as a design value of reformed gas could be obtained from the reformer outlet. Subsequent operation was performed in the steady state.

INDUSTRIAL APPLICABILITY

According to the present invention, by adopting the step of the reforming catalyst itself being heated by catalyst combustion in addition to the step of heating the reforming catalyst with external heat, the heating of the catalyst is quickened and it is possible to obtain an ideal temperature distribution over the area from the catalyst inlet to the outlet. Consequently, it is synthetically possible to make the starting time shorter than in case of adopting only the step of heating the reforming catalyst with external heat such as a burner. Since a thermal transfer occurs between oxidative exotherm and reforming endotherm in the interior of the reforming catalyst, the starting time is shorter and the load following performance is faster than in the conventional steam reforming method. Thus, the starting method of the present invention is useful for a reformer used in a fuel cell system for example.

The invention claimed is:

1. A method for starting an autothermal reformer comprising a reforming catalyst which also has an oxidizing activity, a burner positioned upstream of the reforming catalyst to heat the reforming catalyst, a liquid fuel vaporizer for vaporizing a liquid fuel, an evaporator for producing steam, and air feed means for the supply of air so as to reform autothermally a vaporized liquid fuel from the liquid fuel vaporizer in the presence of the reforming catalyst, the method comprising:

a first preheating step of heating the reforming catalyst up to a predetermined temperature by introducing the vaporized fuel from the liquid fuel vaporizer and air from the air feed means, in an air-fuel ratio within a range of 1 to 2 by volume, to the burner positioned upstream of the reforming catalyst and burning the vaporized fuel in the burner to heat the reforming catalyst;

a second preheating step of stopping the heating after arrival at the predetermined temperature, feeding the vaporized fuel from the liquid fuel vaporizer and the air from the air feed means, in an air-fuel ratio within a range of 2.5 to 5 by volume, to the reforming catalyst at the predetermined temperature, allowing the fuel to be oxidized by the reforming catalyst and thereby heating the reforming catalyst; and a starting step of also supplying steam to the reforming catalyst heated by the second preheating step and starting autothermal reforming under the condition for a steady state.

2. A method for starting an autothermal reformer according to claim 1, wherein the shift from the first to the second preheating step is performed upon arrival of a reforming catalyst bed inlet temperature at 250° C. or higher.

3. A method for starting an autothermal reformer according to claim 1, wherein the shift from the second preheating step to the steady state is performed upon arrival of a reforming catalyst bed inlet temperature at 600° C. or higher and a reforming catalyst bed outlet temperature at 400° C. or higher.

4. A method for starting an autothermal reformer according to claim 1, wherein stopping the heating after arrival at the predetermined temperature in the second heating step is performed by extinguishing a fire of the burner by increasing an amount of the air from the air feed means for the supply of air.

5. A method for starting an autothermal reformer according to claim 4, wherein the shift from the first to the second preheating step is performed upon arrival of a reforming catalyst bed inlet temperature at 250° C. or higher.

6. A method for starting an autothermal reformer according to claim 4, wherein the shift from the second preheating step to the steady state is performed upon arrival of a reforming catalyst bed inlet temperature at 600° C. or higher and a reforming catalyst bed outlet temperature at 400° C. or higher.

* * * * *

UNITED STATES PATENT AND TRADEMARK OFFICE
CERTIFICATE OF CORRECTION

PATENT NO. : 7,837,858 B2  
APPLICATION NO. : 11/992335  
DATED : November 23, 2010  
INVENTOR(S) : Yukihiro Sugiura et al.

It is certified that error appears in the above-identified patent and that said Letters Patent is hereby corrected as shown below:

On the Title page, Item (75) Inventors, reads as follows:

"Yukihiro Sugiura, Kanagawa (JP);  
Yasushi Mizuno, Kanagawa (JP)"

should read as follows:

--Yukihiro Sugiura, Yokohama-shi (JP);  
  Yasushi Mizuno, Yokohama-shi (JP)--.

Signed and Sealed this  
Tenth Day of April, 2012

David J. Kappos  
*Director of the United States Patent and Trademark Office*